United States Patent [19]

Hayward et al.

[11] 4,152,463

[45] * May 1, 1979

[54] HIGHLY NUTRITIOUS, PROTEIN AND VITAMIN ENRICHED FOOD BAR

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[*] Notice: The portion of the term of this patent subsequent to Apr. 13, 1993, has been disclaimed.

[21] Appl. No.: 859,196

[22] Filed: Dec. 9, 1977

Related U.S. Application Data

[62] Division of Ser. No. 710,479, Aug. 2, 1976, abandoned.

[51] Int. Cl.$^2$ .............................................. A23G 3/00
[52] U.S. Cl. ................................... 426/289; 426/311; 426/571
[58] Field of Search ............... 426/307, 302, 571, 572, 426/324, 72, 474, 99, 311, 310, 96, 73, 418, 532, 92, 93, 601, 89, 656, 102, 657, 289

[56] References Cited

U.S. PATENT DOCUMENTS

| | | | |
|---|---|---|---|
| 2,937,091 | 5/1960 | Rosenberg | 426/73 X |
| 3,097,947 | 7/1963 | Kemmerer | 426/73 X |
| 3,437,428 | 4/1969 | Quesada et al. | 426/324 X |
| 3,615,592 | 10/1971 | Peterson | 426/572 |
| 3,814,819 | 6/1974 | Morgan | 426/72 |
| 3,950,545 | 4/1976 | Hayward et al. | 426/72 |
| 3,976,800 | 8/1976 | Deininger et al. | 426/311 |
| 4,018,901 | 4/1977 | Hayward et al. | 426/72 |
| 4,038,423 | 7/1977 | Hayward et al. | 426/72 |
| 4,039,688 | 8/1977 | Hayward et al. | 426/571 X |
| 4,049,832 | 9/1977 | Hayward et al. | 426/72 |

OTHER PUBLICATIONS

Williams; Chocolate and Confectionary, Leonard Hill [Books] Ltd., 9 Eden St., N.W., London, England, 1956, pp. 157, 158.

*Primary Examiner*—Kenneth M. Schor
*Attorney, Agent, or Firm*—Charles J. Hunter

[57] ABSTRACT

A food bar is disclosed comprising marshmallow, low in reducing sugars and being fortified, and with the marshmallow including fortification both with protein and vitamins, with the protein fortification including therein at least two separate and distinct protein materials having reduced water binding capability, the vitamins being fat coated, and the marshmallow having a water activity coefficient, $A_w$, no greater than 0.85. A hermetically sealed container completely encircles the food bar, a water converting catalyst is within the confines of the container, and an atmosphere surrounds the fortified marshmallow in the container, with the atmosphere comprising no more than about 4 percent by weight oxygen and the remainder of the atmosphere comprising an inert gas and sufficient hydrogen to combine with all the oxygen and convert it to water.

4 Claims, No Drawings

HIGHLY NUTRITIOUS, PROTEIN AND VITAMIN ENRICHED FOOD BAR

This is a division, of application Ser. No. 710,479, filed Aug. 2, 1976, now abandoned.

BACKGROUND OF THE INVENTION

1. Field of the Invention:

This invention relates to a food bar, having marshmallow base, which is fortified by protein fortification as well as vitamin inclusion therein.

2. Description of the Prior Art:

The basic process for the production of marshmallow as it is known today was first shown in U.S. Pat. No. 2,600,569 to E. T. Oakes in 1952. This invention was the first showing of the injection of gas into a marshmallow mix to cause it to puff upon release of gas pressure. Since that time many patents have issued showing different additions to marshmallow to provide different flavoring or other features. While U.S. Pat. No. 3,684,528 showed the inclusion of one type of protein, i.e., non-fat dry milk solids to a marshmallow, it showed the mixing thereof with other materials such as sugar, salt, and vanilla concentrate. The inclusion of fats in marshmallows is not a new or novel idea either. In U.S. Pat. No. 3,556,012 a thorough discussion of the inclusion of fats in marshmallow is presented with the fats in that case being cocoabutter fat.

There has not been any showing heretofore of the inclusion within a marshmallow of two separate and distinct types of protein, each having reduced water binding capability, and with the inclusion therein also of fat coated vitamins. Such a double inclusion of different types of fat coated protein produces a significantly different product from that heretofore shown and produces a type of fortification heretofore unknown in the protein or marshmallow industry.

SUMMARY OF THE INVENTION

It is an object of this invention to provide a food bar having a marshmallow base and being fortified with protein.

It is another object of this invention to provide a protein fortified marshmallow also including fortification by addition of vitamins.

It is an additional object of this invention to provide a system containing marshmallow which is stable against degradation of the fortification products therein.

It is a further object of this invention to produce a new and novel process for producing marshmallow type products.

The objects of this invention are accomplished by combination comprising:

(A) a fortified marshmallow low in reducing sugars and fortified with both protein and vitamins, said protein fortification including therein at least two separate and distinct protein materials having reduced water binding capability, said vitamins being fat coated, and said fortified marshmallow being set and having a water activity coefficient, $A_w$, no greater than 0.85;

(B) a hermetically sealed container completely encircling the marshmallow;

(C) a water converting catalyst within the confines of the container; and (D) an atmosphere surrounding the fortified marshmallow in the container, said atmosphere comprising no more than about 4 percent by weight oxygen and the remainder of the atmosphere comprising an inert gas and sufficient hydrogen to combine with all the oxygen and convert it to water.

It is also preferable within this invention to include within the marshmallow 10 percent by weight of a fat containing 20 percent by weight emulsifier therein. Preferably the fat for use in this invention is a vegetable fat and is emulsified by an emulsifier such as a mixture of polyglycerol esters and lecithin having a free fatty acid content of about 0.5 percent and an HLB ratio of about 7-7.2 but may include such emulsifiers having an HLB range of from about 5 to 8.

The preferable protein materials having reduced water binding capability for use in this invention are the separate systems of: first, a fat coated casein or caseinate salt; and, secondly, a heat treated cereal material which has been heated to gelatinize the starch and denature the protein therein and render it substantially incapable of binding water.

It is also preferable within the scope of this invention to include within the marshmallow mix a polyhydric alcohol. The marshmallow based product produced in this invention preferably has a density of from 110 to 120 oz. per gallon.

The marshmallow based product produced after inclusion of the appropriate amounts of vitamins and protein may be formed into a food product by several different novel methods. First, the marshmallow may be sheeted in a multiplicity of thin layers with each layer having no greater thickness than about ½ inch. This sheeting is accomplished prior to setting of the marshmallow. Secondly, the marshmallow can be formed as two separate groups of marshmallow having different characteristics such as different color or different flavoring and the two groups may then be mixed together but not to the extent that they form one uniform marshmallow mass consistent in all characteristics throughout. In other words, two groups are formed with one group having one type of flavoring and another having a different type of flavoring or color and then these are mixed together to give a swirling effect or the like prior to setting. The marshmallow product is then set conventionally.

A third system for producing a very excellent marshmallow based product is one in which the marshmallow has been combined with an intermediate food product having a moisture content of from 15-45 percent by weight and a water activity coefficient less than 0.85. The mixing may be in any type of conventional mixing although it is preferable to form the intermediate moisture food product in the center surrounded by an outer shell of marshmallow like mixture. It is also preferable to coextrude the marshmallow product with an intermediate moisture food product having a moisture content of from 15 percent to 45 percent by weight. The intermediate moisture food product may be any of the intermediate moisture foods currently available such as stabilized cheese, stabilized meat or jams or jellies. If stabilized cheese or meat are included, it is an additional type of protein fortification within the product.

Preferably, when the product has been intermixed with an intermediate moisture food product, the intermediate moisture food product and the fortified marshmallow product have the same water activity coefficient, $A_w$.

Regardless of the type of forming and mixing of the marshmallow based product, it is preferred to coat it with a coating comprising from about 30 percent to about 40 percent by weight vegetable fat or oil, from about 10 percent to about 40 percent by weight sugar, from about 25 percent to about 50 percent by weight non-fat dry milk solids, and a flavoring agent. It must be understood that within the requirements of this coating, if variations significantly from the stated values occur, the coating will be absorbed into the product and will give a running effect which is totally undesirable in a food product. In other words, the ranges stated above with respect to the coating must be as strictly as possible adhered to. The coating should be granulated until it has a particle size of from about 5–15 microns.

In addition, the coating may also include fat coated vitamins. In producing a fat-coated vitamin for inclusion within the product, it is preferable to mix the vitamins and the fatty material with a solid or liquid cooling agent, such as dry ice or liquid nitrogen, and continue the mixing until they are solid. After they are solidified, they can be subdivided until they have a particle size sufficiently small to be distributed throughout the coating material. After sudivision, the cooling material is then allowed to evaporate or sublime. The vitamins are then added to the coating material.

The objects of this invention are further accomplished by the combination comprising: a fortified food bar having a water activity coefficient, $A_w$, less than 0.85, and comprising a formed, set mixture of:
1. marshmallow having no more than about 5 percent by weight reducing sugars;
2. fat coated vegetable and/or animal protein;
3. heat treated vegetable and/or animal protein material which has been heated to gelatinize the starch and denature the protein therein and render the material substantially incapable of binding water;
4. polyhydric alcohol;
5. fat containing up to 20 percent by weight of one or more emulsifiers, and
6. fat coated vitamins;

(B) a hermetically sealed container completely encircling the marshmallow;

(C) a water converting catalyst within the confines of the container: and (D) an atmosphere surrounding the food bar in the container, said atmosphere comprising no more than about 4 percent by weight oxygen and the remainder of the atmosphere comprising an inert gas and sufficient hydrogen to combine with all the oxygen and convert it to water.

As expressed before, this marshmallow product may have the inclusion of the other various materials therein to provide a highly acceptable product.

The objects of this invention are further accomplished by a process for producing a stable, fortified food bar, said process comprising:

(A) preparing a food bar having therein:
1. marshmallow having no more than about 5 percent by weight reducing sugars therein,
2. fat coated casein or caseinate salts,
3. heat treated cereal protein material which has been heated to gelatinize the starch and denature the protein therein and render the protein material substantially incapable of binding water,
4. polyhydric alcohol;
5. a fat containing up to 20 percent by weight of one or more emulsifiers; and
6. fat coated vitamins;

(B) inserting the food bar along with a water converting catalyst into a container;

(C) replacing at least about 96 percent by weight of the atmosphere in the container with an atmosphere containing hydrogen and an inert gas; and (D) sealing the container to prevent further oxygen from reaching the food bar.

Preferably, in the above process, the preparation of the food bar includes coextrusion of the marshmallow bar with an intermediate moisture food product having a moisture content of from 15 percent to 45 percent by weight and wherein the food bar has a water activity, $A_w$, less than 0.85. Also preferably, the bar, prior to the sealing in the container is coated with a coating comprising from about 30 percent to 45 percent by weight vegetable fat or oil, from about 10–40 percent by weight sugar, from about 25 percent to about 50 percent by weight non-fat dry milk solids, and a flavoring agent in accordance with the conditions specified hereinbefore.

In the above process, the preparation of the food bar can also include an improvement where the food bar is coated with a coating comprising from about 30 percent to about 40 percent by weight vegetable fat or oil, from about 10 percent to 40 percent by weight sugar, from about 25 percent to about 50 percent by weight non-fat milk solids, and a flavoring agent.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup," we intend to refer to a marshmallow syrup. Depending on the method for marshmallow production, marshmallow syrup usually has a moisture content of about 16–30 percent by weight, very little of which is lost in processing. A more detailed description of marshmallow syrup is found later on in this discussion.

Marshmallow syrup generally has a density of approximately 127 oz. per gallon. In the production of marshmallow, marshmallow syrup is whipped and intermixed with an inert, edible gas such as air or nitrogen until the density of the mixture is approximately 44 oz. per gallon. This volumetric expansion, i.e., volume increase of 2–3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e., usually below 1 percent by weight fat. This low fat content has been required in order to prevent excess fat from precluding expansion during whipping and aeration. Since the marshmallow whip is essentially a mixture of ingredients mixed with and whipped with water, very small quantities, i.e., above 1 percent by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

A marshmallow mix for use in production herein includes various ingredients which as described above include various non-reducing saccharides, water, gelatin, and flavoring agents. By use of the term "gelatin" we intend to mean a glutinous material obtained from animal tissues by prolonged boiling or any of the various substances resembling gelatin in physical properties. Gelatin is sold on the basis of bloom test or jelly test and gelatin having a bloom test or jelly test of from 150–300 grams is normally considered acceptable for marshmallow production. It is usually preferred, however, to use from 1.5 to 2.5 percent by weight of a gelatin having a bloom test of from 225–250 grams with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812.

The process of this invention, when the requirement is for the mixing of air with the marshmallow mix until the atmospheric pressure density thereof is from about 30–74 oz. per gallon, is intended to mean those processes in which air can be injected or whipped into the marshmallow mix to give it the requisite density. For instance, the Oakes type gas injection system, as previously referred to, is perfectly acceptable. Additionally, the whipping of air by a simple wire mixer can be sufficient so long as sufficient air is included in the product to insure the requisite density. Additionally, other new types of marshmallow equipment well known in the industry are now capable of inserting or injecting sufficient amounts of air into the marshmallow while mixing it to provide at atmospheric pressure the requisite density. If the mixing is not at atmospheric pressure, then prior to the casting or setting thereof the pressure must be reduced until it is approximately atmospheric.

Marshmallow mixes that may be used in this invention are the normal marshmallow mixes well known in the industry modified to remove substantially all of the reducing sugars therefrom. Ingredients used in marshmallow production as well as amounts thereof are well known in the marshmallow industry. Among the many formulas that are acceptable for marshmallow production are those found in the following: *Candy Making As A Science And Art*, by Claude D. Barnette, Don Guessel Publications, Inc., N.Y., 1960, pp. 99–103; Encyclopedia of *Candy And Ice Cream Making*, by Simon I. Leon, Chemical Publishing Co., N.Y., 1959, pp. 294–304; and *A Testbook On Candy Making*, by Alfred E. Leighton, Manufacturing Confectioners Publishing Co., Oak Park, Ill., 1952, pp. 55–68. A typical formula for use herein would include about 60–85 percent by weight sucrose, about 15–25 percent by weight water; about 2–5 percent by weight invert sugar; and about 1–4 percent by weight gelatin. The typical formula may also include some alterations of the formula such as replacing part or all sugars and syrups with non-reducing sugars and syrups. Various flavoring agents and humectants may also be added in minor amounts. Preferably, in this invention, the marshmallow mix has about 80.1 percent by weight sugar, about 18.3 percent by weight water, about 1.2 percent by weight gelatin, and about 0.4 percent other ingredients such as flavoring, coloring and preservatives.

It must be emphasized that the marshmallow base must be low, i.e., below 5 percent by weight, in reducing sugars or the effect on the protein will make the product unacceptable.

The product of this invention must include a high protein, i.e., about 30 percent protein, ingredient of reduced water binding capability. The high protein ingredient can be one of two types: it can be a fat coated casein or caseinate salt and/or a cereal protein which has been heat treated to substantially reduce the water binding capability thereof.

When fat coated casein or caseinate salts are used, they are coated with a vegetable oil or fat having a melting point below 120° F. The coating must be applied prior to inclusion of the casein in the product and cannot simply be mixed with a fat containing mixture to produce an acceptable product.

When cereal protein is used, it is heated to denature the protein therein and gelatinize the remaining starch therein until the protein ingredient is substantially incapable of binding water. Of course, the heating cannot be so severe that it destroys the protein efficiency ratio substantially. It has been found that a heating of 350° F. for ½–1½ minutes accomplishes this but other such times and temperatures that produce an equivalent result are acceptable and within the purview of one skilled in the art of heat treating protein materials.

The density of the marshmallow based product produced by this invention must be from 111–119 oz. per gallon at atmospheric pressure, and sufficient air must be inserted therein to produce this requisite density effect. When referring to density of the product, it is intended to refer to the density at atmospheric pressure, i.e., gas pressure removed, unless it is otherwise stated.

It is preferred to maintain the aerated marshmallow mixture at a temperature of from about 80° F. to about 90° F. during the processing. However, such other temperatures as may be commonly used in the marshmallow industry are acceptable outside of this preferred range. In addition to the fortification of the marshmallow with the protein, it may, as well, include fat coated vitamins.

It must be understood that the fortification by the protein includes fortification by a protein material which has been some way treated to the extent that it cannot substantially bind water. In the case of casein as a protein, the casein material is admixed with fat until its water binding capability is substantially reduced. If a cereal protein, such as an oil seed vegetable protein, is used, then it must be heated to the extent that the starch therein is gelatinized and the protein denatured to the extent that it cannot substantially bind water. It must be understood that the heating of the proteinaceous material must not be to such a temperature that it destroys the protein efficiency of the protein therein.

Of great importance within the scope of this invention is the use of vitamin C as a fortification vitamin both in the coating and in the marshmallow mix itself.

After the product is produced, regardless of the type of addition and forming thereof, the marshmallow or bar either alone or formed by mixing the marshmallow with another cereal product or the like, is inserted into a container along with a water converting catalyst followed by displacing the atmosphere in the container with a hydrogen containing atmosphere containing not more than about 4 percent by weight oxygen, then followed by sealing of the container to prevent further oxygen from reaching the material.

In the process, the marshmallow bar is inserted into the container along with the water converting catalyst. The water converting catalyst can be any of the known catalysts which are inert with respect to the produt and which are also non-toxic when included into a food package. It has been found, for instance, that it is highly desirable to use a noble metal catalyst including such things as palladium and platinum catalysts which are well known to convert a mixture of oxygen and hydrogen to water. The catalyst can be sandwiched between layers of air permeable material or can be affixed to an insert or to the container wall or any other such method that provides contact with the atmosphere without contaminating the product.

After the product is inserted into the container with the water converting catalyst, the atmosphere thereon must be displaced with a hydrogen containing atmosphere, containing not more than about 4 percent by weight oxygen. In this case, the hydrogen containing atmosphere must be an inert gas, inert with respect to the product and non-toxic, and having sufficient hydrogen to combine with the oxygen, and preferably with an excess, so that there is insurance that all the oxygen is converted. Nitrogen has been found to be highly acceptable as an inert atmosphere for inclusion with the hydrogen. The displacing of the atmosphere with the inert gas and hydrogen can be a displacement using a flushing system which flushes completely the surrounding atmosphere in the container, or may be a double flushing system, or a combination as long as the end goal of removal of all or substantially all of the oxygen is accomplished, or at least until about 4 percent by weight maximum oxygen is achieved. Thereafter, the container is sealed to prevent further oxygen from reaching the product. At such time, gradually over the containing of the product, the catalyst converts the oxygen and hydrogen to water and the produced water is absorbed by the product or retained in the container. The amount of produced water is so small it doesn't have a harmful effect on the product. In such a case, any oxygen remaining in the container is unable to render the protein or vitamins ineffective. Additionally, the benefits of the product are such that it does not degrade due to oxygenation of any of the materials or ingredients within the marshmallow based product.

It is preferable when using the noble metal catalyst to either spray it on the side of the container with some type of adhesion that will cause it to stick thereon or to sandwich it between materials which are air permeable in order that the atmosphere may permeate therethrough to be converted. By use herein of the term "water converting catalyst" it is intended to mean any catalyst which is inert with respect to the product and which can convert oxygen and hydrogen to water within the system.

It is preferred in the process of this invention to include in the marshmallow a fat coated vitamin, coated with a fatty material comprising a saturated aliphatic acid having between 12 and 20 carbon atoms inclusive or a glyceride having the formula:

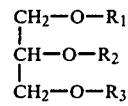

wherein $R_1$ is an acyl radical derived from a saturated aliphatic acid having between 12 and 20 carbon atoms per molecule and $R_2$ and $R_3$ are hydrogen or the same as $R_1$. The fatty material must have a melting point of from 100° F. to 200° F. The preferable process for producing the coated vitamin is one in which the fatty material is admixed with a mixture of vitamins and added thereto is a liquid or solid cooling agent such as liquid nitrogen or liquid or solid carbon dioxide. The cooling agent is admixed in amounts sufficient to solidify the mixture and maintain the mixture solidified throughout the coating process. The cooling agent must be non-toxic and chemically inert with respect to the vitamins and the fatty material. After the mixture of cooling agent and fatty material and vitamins is completed to the solidification of the fatty material, the mixture is then subdivided until a major portion thereof passes through a number 20 U.S. Sieve but has a particle size above about 75 microns in diameter. After this size distribution is achieved, the cooling material is then allowed to remove itself therefrom by sublimation or evaporation. One of the more important vitamins for use in the above process is vitamin C.

Within the scope of this invention, it is fully intended to include various ingredients for additional purposes. For instance, polyhydric alcohols such as those normally found in intermediate moisture food products, including that in U.S. Pat. No. 3,741,774 may be included therein.

DESCRIPTION OF THE PREFERRED EMBODIMENTS

This invention may be more fully described but is not limited by the following examples.

EXAMPLE 1

A marshmallow mix is prepared. For the mixture, 0.927 parts by weight gelatin (Bloom Test Strength 250 gms.) is added to a first jacketed kettle containing 8.2 parts by weight water. The gelatin is then allowed to soak in the water for 5 minutes and then steam is introduced into the jacketed kettle until the temperature of the mixture is 145° F. while maintaining the mixture at 145° F. the mixture is stirred until all the gelatin is dissolved in the water. The mixture is then set aside for inclusion in the process. This mixture is referred to as the gelatin mix.

The marshmallow premix is prepared in a second jacketed kettle. For the marshmallow premix 8.3 parts by weight water, 0.067 parts by weight preservative, 77.2 parts by weight sucrose, 0.046 parts by weight flavoring (vanilla), 5 parts by weight emulsified vegetable oil, 1 part by weight sorbitol, and 0.21 parts by weight color are added to the jacketed kettle. These ingredients are then stirred until completely mixed. The marshmallow mixture or marshmallow syrup is then prepared by adding the gelatin mix prepared in the first jacketed kettle to the marshmallow premix in the second jacketed kettle. These ingredients are then thoroughly mixed until the mixture is uniform throughout with respect to each of the ingredients. The ingredients are circulated through a heat exchanger and the temperature reduced to about 75° F. and maintained constant at that temperature. The mixture is then introduced as a continuous stream in an Oakes continuous marshmallow mixer and beater (The E. T. Oakes Corporation, Islip, N.Y.). The mixture is adjusted so that the aerated marshmallow mixture leaving the mixer is at a temperature of 85° F.±3° F. Air is injected into the mixture and the flow rate and pressure of the air are adjusted until samples of the product exposed to atmospheric pressure have a density of about 40–60 psig. The mixture is then introduced into the atmosphere whereupon it expands and has a density of about 50 oz. per gallon. Casein, in an amount of 10 parts by weight, is mixed with a vegetable fat until the casein completely swells and cannot retain water. Soy protein isolate is heated at 350° F. for 1 minute until the starch therein is gelatinized and the protein therein is denatured in the material incapable of binding water. The two types of protein are thoroughly mixed with the aerated marshmallow mix. The mixture is formed in thin sheets no greater than ½ inch thick and allowed to set. The uniformly blended mixture has a moisture content of about 28 percent by weight, a density of about 115 oz. per gallon, a sweet marshmallow flavor, a firm, spongy characteristic texture, and a quality color. The set product is then introduced into a container along with a palladium catalyst. The palladium catalyst is sandwiched between two layers of polyethylene which are permeable to the air or atmosphere sufficient to allow it to pass therethrough. The container is then flushed with a mixture containing 1 part by weight hydrogen and 4 parts by weight nitrogen. After double flushing with this gas, the product is then sealed in the container to prevent further oxygen from entering the bag. After a period of time the product is found to have high quality and good taste and the protein added thereto is found to be very stable.

EXAMPLE 2

Example 1 is repeated but glycerol rather than sorbitol is added to the marshmallow mix in an amount of 1 part by weight. Again, an excellent product is prepared.

EXAMPLE 3

Example 1 is repeated with the exception that the marshmallow mix included therein 1 part by weight glycerol. Again, an excellent product is produced.

EXAMPLE 4

Example 1 is repeated except the product is formed by coextruding it with a cheese product produced in accordance with the Example of U.S. Pat. No. 3,741,774. The cheese product is on the inside and the marshmallow product on the outside. Again, an excellent product is produced.

EXAMPLE 5

Example 2 is repeated with the conditions expressed in Example 4. Again, an excellent product is produced.

EXAMPLE 6

Example 3 is repeated with the conditions of Example 5. Again, an excellent product is produced.

EXAMPLE 7

Example 1 is repeated except the forming is produced by separating the marshmallow into two separate and distinct sections and including a strawberry flavoring in one of the sections. The two were then swirled together to give it a swirled effect. The resulting product is highly acceptable.

EXAMPLE 8

Example 2 is repeated with the conditions of Example 7. Again, an excellent product is produced.

EXAMPLE 9

Example 3 is repeated with the conditions on Example 7. Again, an excellent product is produced.

EXAMPLE 10

Example 1 is repeated with the exception that the product after being formed is coated with a coating prepared by mixing 35 parts by weight vegetable fat with 30 parts by weight sugar and 35 parts by weight non-fat dry milk solids and granulating the mixture to 10 microns. The coating is added in an amount of 1 part by weight coating to 10 parts by weight bar. Again, an excellent product is produced.

EXAMPLE 11

Example 2 is repeated with the conditions of the coating of Example 10. Again, an excellent product is produced.

EXAMPLE 12

Example 3 is repeated with the coating conditions of Example 10. Again, an excellent product is produced.

EXAMPLE 13

Example 4 is repeated with the coating conditions of Example 10. Again, an excellent product is produced.

EXAMPLE 14

Example 5 is repeated with the coating conditions of Example 10. Again, an excellent product is produced.

EXAMPLE 15

Example 6 is repeated with the coating conditions of Example 10. Again, an excellent product is produced.

EXAMPLE 16

Example 7 is repeated with the conditions of Example 10. Again, an excellent product is produced.

EXAMPLE 17

Example 8 is repeated with the conditions of Example 10. Again, an excellent product is produced.

EXAMPLE 18

Example 9 is repeated with the conditions of coating expressed in Example 10. Again, an excellent product is produced.

It may thus be seen that this invention provides a new and novel concept in the production of food bars by use of a marshmallow base. The food bars each have a water activity coefficient less than 0.85 and are packaged in a novel system heretofore not shown with respect to marshmallow products. The products are fortified by two separate and distinct fortification ingredients and thus provide a new and novel product. Heretofore, there has been no showing of the inclusion of fat coated products in two separate and distinct fats and there has not been any showing of the type of inclusion of ingredients shown within the product of this invention to the extent shown herein with the fortification thereof maintaining its integrity throughout the process and providing a system of consistently high quality product. Heretofore, there has not been shown a product having all the included qualities and ingredients of this invention.

Having fully described this new and unique invention, the following is claimed:

1. A process for producing a stable, fortified food bar, said process comprising:
   A. preparing a food bar having therein:
      I. marshmallow having therein no more than about 5 percent by weight reducing sugars;
      II. fat coated casein or caseinate salts;
      III. heat treated starch containing cereal protein material which has been heated to gelatinize the starch and denature the protein therein;
      IV. polyhydric alcohol;
      V. emulsified fat; and
      VI. fat coated vitamins;
   B. inserting the food bar along with a water converting catalyst into a container;
   C. replacing at least about 96 percent by weight of the atmosphere in the container with an atmosphere containing hydrogen and an inert gas; and
   D. sealing the container to prevent further oxygen from reaching the food bar.

2. A process as in claim 1 wherein the preparation of a food bar includes coextrusion of the marshmallow bar with an intermediate moisture food product having a moisture content of from 15 percent to 45 percent by weight, and wherein the food bar has a water activity, $A_w$, less than 0.85.

3. A process as in claim 1 wherein the food bar is coated with a coating comprising from about 30 percent to about 40 percent by weight vegetable fat or oil, from about 10 percent to 40 percent by weight sugar, from about 25 percent to about 50 percent by weight non-fat dry milk solids, and a flavoring agent.

4. A process for producing a stable, fortified food bar, said process comprising:
   A. preparing a food bar having therein:
      I. marshmallow having therein no more than about 5 percent by weight reducing sugars;
      II. fat coated protein material;
      III. heat treated starch containing protein material which has been heated to gelatinize the starch and denature the protein therein;
      IV. polyhydric alcohol;
      V. a fat containing an emulsifier therein; and
      VI. fat coated vitamins;
   B. inserting the food bar along with a water converting catalyst into a container;
   C. replacing at least about 96 percent by weight of the atmosphere in the container with an atmosphere containing hydrogen and an inert gas; and
   D. sealing the container to prevent further oxygen from reaching the food bar.

* * * * *